United States Patent [19]

Guhse

[11] Patent Number: 4,598,294
[45] Date of Patent: Jul. 1, 1986

[54] TEST SIGNAL GENERATOR FOR COHERENT AIR-TO-GROUND RADARS

[75] Inventor: Raymond A. Guhse, Millersville, Md.

[73] Assignee: The United States of America as represented by the Secretary of the Navy, Washington, D.C.

[21] Appl. No.: 564,864

[22] Filed: Dec. 23, 1983

[51] Int. Cl.⁴ .................................................. G01S 7/40
[52] U.S. Cl. .................................................. 343/17.7
[58] Field of Search ................ 343/17.7, 400, 402, 343/405

[56] References Cited

U.S. PATENT DOCUMENTS

| | | | |
|---|---|---|---|
| 2,977,590 | 3/1961 | Lovick | 343/18 R |
| 3,144,646 | 8/1964 | Breithaupt | 343/405 X |
| 3,153,760 | 10/1964 | Henderson | 343/703 |
| 3,216,014 | 11/1965 | Kerr | 343/17.7 |
| 3,719,077 | 3/1973 | Haupt et al. | 343/17.7 X |
| 3,787,866 | 1/1974 | Gamertsfelder et al. | 343/703 |
| 4,003,055 | 1/1977 | Eriksson et al. | 343/17.7 |
| 4,317,214 | 2/1982 | Attinello | 455/1 |

Primary Examiner—Thomas H. Tarcza
Assistant Examiner—John B. Sotomayor
Attorney, Agent, or Firm—Robert F. Beers; Henry Hansen; Vincent T. Pace

[57] ABSTRACT

A test signal generator for on the ground testing of coherent air-to-ground radars has a rotating antenna for simulating aircraft motion when receiving return radar signals. An angular position sensor provides a signal which is proportional to the angular position of the rotating antenna. Correlation of these signals in the radar computer provides a radar test signal having realistic amplitude and doppler histories.

4 Claims, 6 Drawing Figures

TEST SIGNAL GENERATOR FOR COHERENT AIR-TO-GROUND RADARS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to air-to-ground radar systems and more particularly to apparatus for on-the-ground testing of such radar systems.

A fundamental ingredient of air-to-ground pulse doppler radar is the relative motion of the radar with respect to the ground. During ground testing of such radar systems there is no motion of the radar system relative to the ground. Therefore, it is rather difficult to generate test signals that have realistic amplitude and doppler histories. The ability to test pulse doppler air-to-ground modes during on-the-ground testing is somewhat restricted because of the difficulty in generating realistic test signals.

A common method of ground testing consists of using a test target generator that can generate only a single range cell of radar return. This method tests only a small part of the radar mode operation. It does not test automatic receiver gain setting algorithms or range-cell to range-cell dynamic range requirements. Furthermore, it does not display amplitude presentation or range/doppler cell registration with multiple targets.

Thus it appears to be desirable to have a means for generating test signals which have realistic amplitude and doppler histories in order to adequately ground test coherent air-to-ground radar systems.

SUMMARY OF THE INVENTION

Accordingly, one object of this invention is to generate test signals for on-the-ground testing of air-to-ground radar systems.

Another object of this invention is to generate radar test signals having realistic amplitude and doppler histories.

A further object of this invention is to generate test radar return signals from real terrain which simulate aircraft motion but without actually moving the radar system.

Still another object of this invention is to generate realistic ground return radar signals which can be used to perform detailed mode testing in a laboratory environment.

The above and other objects are realized in the present invention by a receiving antenna mounted on a rotating arm. Rotation of the receiving antenna simulates the motion between the radar system and the ground. The operation is bistatic in that a stationary transmitting antenna is used only on transmit and the rotating test antenna is used only on receive. The system generates test signals having realistic amplitude and doppler histories due to the motion of the receiving antenna relative to the ground.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
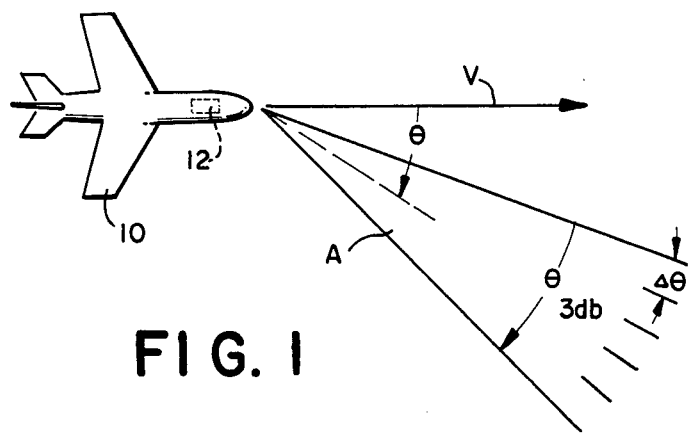
FIG. 1 shows a typical air-to-ground radar in use.
Figure 3:
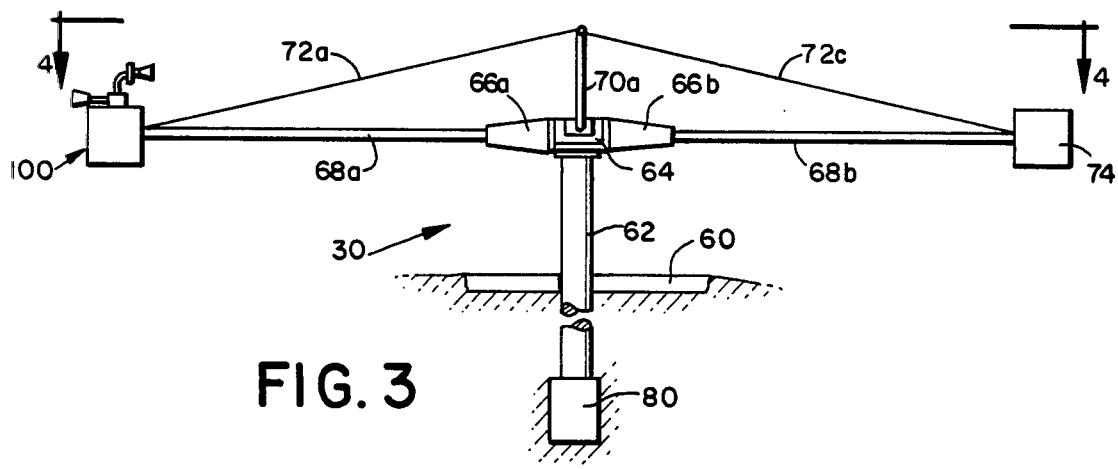
FIG. 3 shows an embodiment of a rotating antenna according to the present invention.
Figure 4:
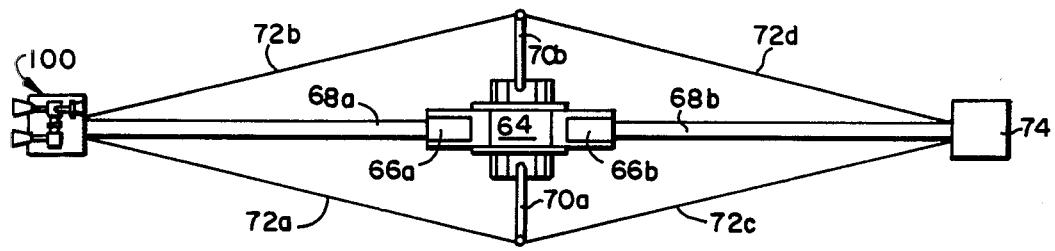
FIG. 4 shows a plan view of the rotating antenna as viewed along line 4—4 of FIG. 3.

Processing of pulse doppler air-to-ground radar modes takes advantage of the doppler history of the return signals. FIG. 1 illustrates a typical air-to-ground radar in use. Radar beam A generated by radar system 12 emanates from aircraft 10. Relative motion between an illuminated target and the radar antenna located on aircraft 10 is what generates the doppler history. The instantaneous doppler frequency, $f_d$, is a function of the aircraft 10 velocity, as represented by velocity vector V in FIG. 1, and the angle $\theta$ between the velocity vector V and the beam A. This function may be expressed as $$f_d = \frac{2V}{\lambda} \cos \theta, \tag{1}$$

where $\lambda$ is the characteristic RF wavelength.

Variation of the doppler frequency, $f_d$, across the antenna beamwidth $\theta_{3db}$, allows for separation of return signals by means of frequency filtering to achieve an azimuth resolution finer than the actual antenna beamwidth. Thus, the total frequency spread across the 3db beamwidth is given by:

$$\Delta f_{3db} \simeq \frac{2V}{\lambda} \theta_{3db} \sin \theta \tag{2}$$

for $\theta > \theta_{3db}$. The azimuth resolution can be improved to $\Delta \theta = \theta_{3db}/N$, by forming N frequency filters of width $\Delta f_{3db}/N$.

Figure 2:
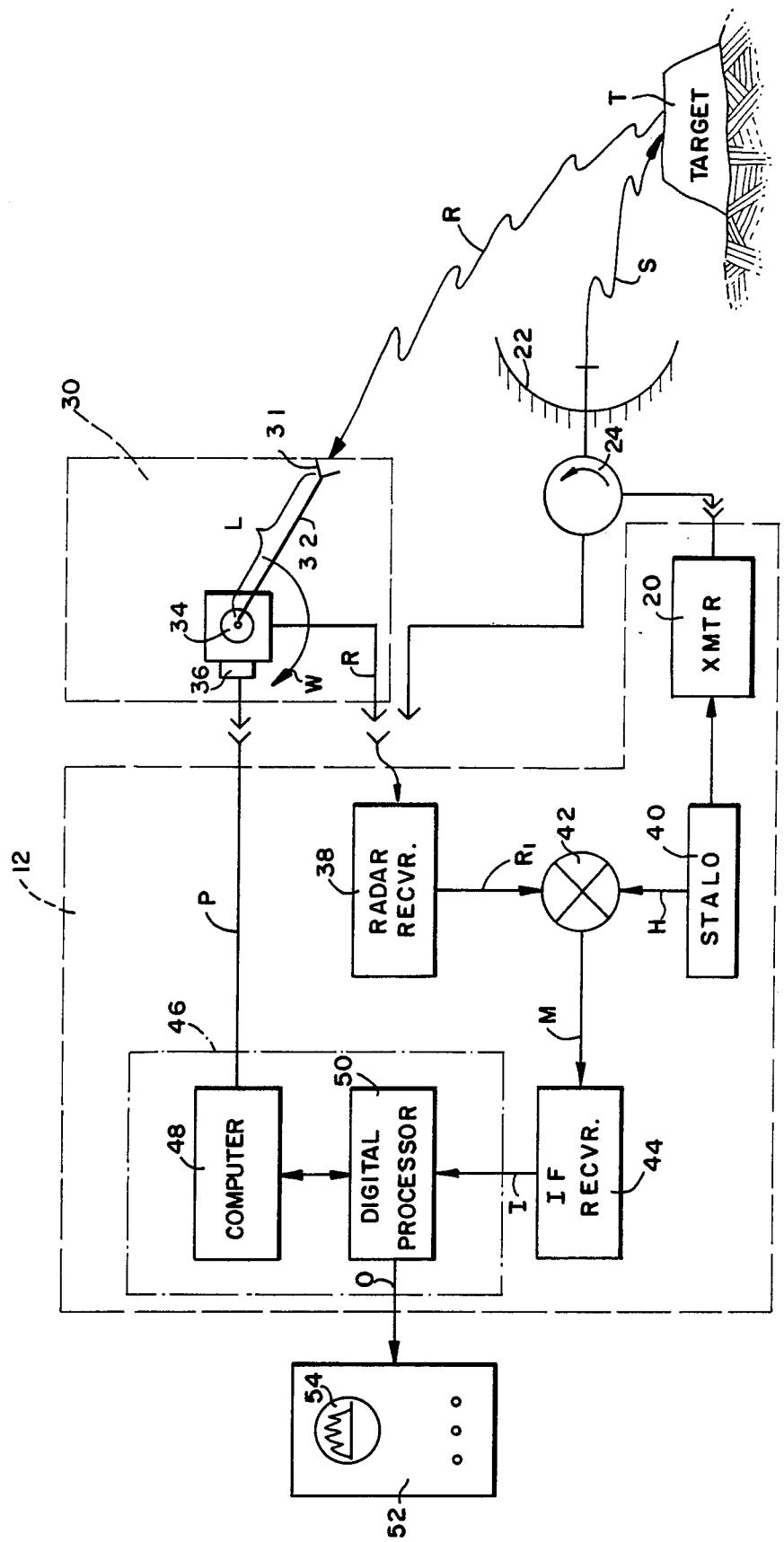
FIG. 2 is a block diagram of an embodiment of a radar test system according to the present invention.
Figure 5:
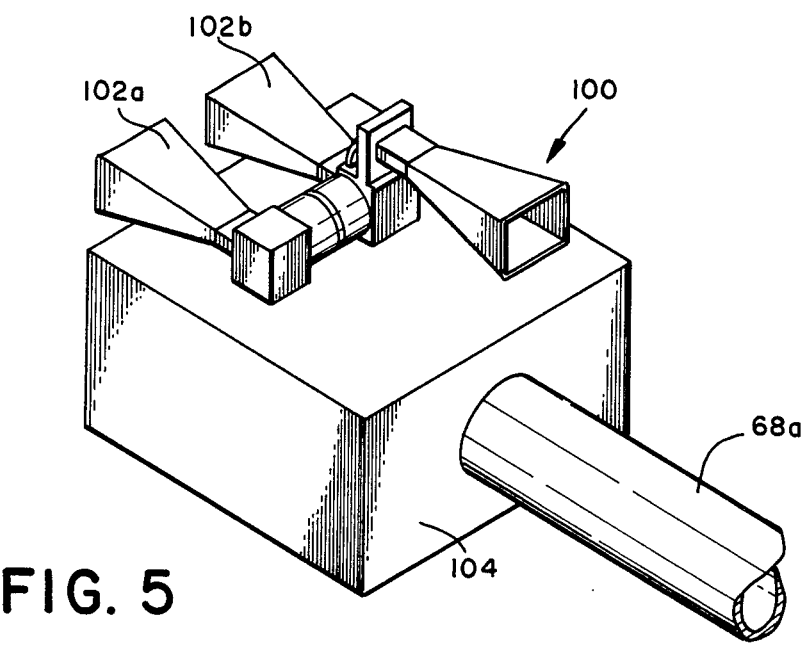
FIG. 5 shows the construction of an antenna unit employed on the rotating antenna of FIG. 3.

Referring now to the remaining drawings wherein like reference numerals indicate the same or similar components across the views, and in particular to FIG. 2, there is shown a block diagram of a typical radar testing system incorporating a test signal generator 30 according to the present invention.

A coherent radar transmitter 20 is connected to stationary antenna 22 through a circulator 24. Antenna 22 propagates a radar signal S toward a ground target T. A return radar signal R is reflected from target T and detected by receiving antenna 31. Antenna 31 is mounted on an arm 32 of length L which rotates at a rate of W rpm. The signal R received from rotating antenna 31 goes through a rotary joint 34 and is input to microwave receiver 38 in place of the receive port from circulator 24. Receiver 38 outputs an electronic signal $R_1$.

The system operates in a bistatic mode of operation in that the transmitted signal S emanates from the stationary antenna 22 and the return signal R is received by rotating antenna 31. The motion of antenna 31 produces a doppler shift on the return signal R given by:

$$f = \frac{V_R}{\lambda} = \frac{2\pi wL}{\lambda} \cos wt \qquad (3)$$

where $V_R$ is the velocity of antenna 31 relative to target T and $\lambda$ is the characteristic RF wavelength of the radar signal S.

Equation (3) has the same form as doppler equation (1) for the airborne radar of FIG. 1. The angle wt is with respect to a specific point on the ground. Therefore, two points on the ground which are separated in azimuth will have different doppler histories. This doppler history is very similar to that obtained with an airborne moving platform, consequently standard processing techniques can be used to obtain the azimuth resolution improvement.

As shown in FIG. 2, a stabilized local oscillator 40 provides a high phase stability reference signal H to both transmitter 20 and receiver 38. The signal $R_1$ is down modulated by the stabilized reference signal H in mixer 42 to produce demodulated signal M. Signal M is then input to IF receiver 44 from which it is input to the radar processing electronics 46 as an intermediate frequency signal I.

The radar processing electronics 46 includes a radar computer 48 which receives both input signal P from an angular position sensor 36 located on the test signal generator 30 and IF signal I from the IF receiver 44 through a digital processor 50. Computer 48 generates an output signal O based on the return radar signal and the angular position of the rotating antenna 31. Computer signal O is input to a radar display system 52 through digital processor 50 for display on a viewing screen 54.

Simulation of the return signals for a coherent map mode requires several rotations of receiving antenna 31. During each rotation of receiving antenna 31 data is collected for one azimuthal beam of stationary transmitting antenna 22. Several revolutions of antenna 31 may be required to provide the desired angular coverage. The collected data can be processed in real time with each pass of receiving antenna 31. Alternatively, all blocks of data can be stored and then processed as a batch by the radar computer 48.

In practice, radar systems such as the APG-68 and the APQ-164 would be connected to the transmit port of circulator 24, test signal generator 30, and display system 52. The respective radar computer 48 of radar system 12, which is normally programmed to calculate the doppler history in accordance with equation (1), would be reprogrammed to calculate the doppler in accordance with equation (3) during testing.

A test signal generator 30 according to the present invention is illustrated in greater detail in FIGS. 3, 4, 5, and 6. Test signal generator 30 has suporting structure 60 which may be of some suitably strong structural material such as steel or aluminum.

A vertical shaft 62 is mounted in structure 60 such that it is free to rotate about its longitudinal axis. Coupling hub 64 is fastened to the top of shaft 62. Elongated arms 68a,b are extendably attached to coupling 64 by means of journals 66a,b respectively. Additional support for the elongated arms 68a,b is provided by means of guy wires 72a,b,c, and d which are strung from support arms 70a,b suitably mounted on coupling 64, to the ends of arms 68a,b. Vertical shaft 62 is driven by a motive device 80 such as an electric motor.

Antenna unit 100 is mounted at the free end of arm 68a and is counterbalanced by counterbalancing weight 74 mounted at the free end of arm 68b. Antenna unit 100 includes one or more microwave antennas. In the embodiment shown in FIG. 5 there are two microwave antennas 102a,b mounted on a box 104.

Figure 6:
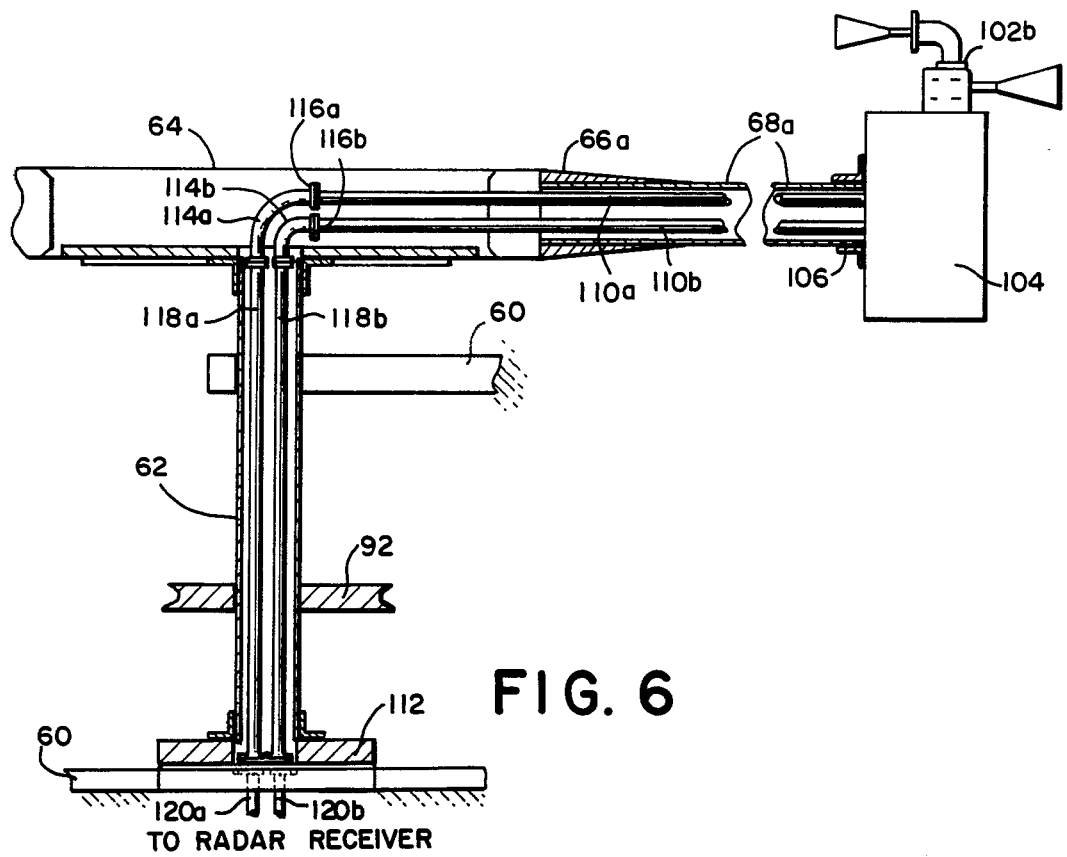
FIG. 6 shows the routing of waveguides within the rotating antenna of FIG. 3.

Antennas 102a,b are connected to the radar receiver 38 by means of waveguides 110a,b as shown in FIG. 6. Waveguides 110a,b extend from antenna box 104 through arm 68a. At coupling 64 the waveguides 110a,b are angled downward by means of 90° elbow sections 114a,b to connect with waveguides 118a,b. Waveguides 118a,b extend vertically through shaft 62 to a slip ring assembly 112 which operates as a rotary joint. Waveguides 120a,b extend from the stationary side of slip ring assembly 112 to the radar receiver.

Of necessity, waveguides 110a,b; 114a,b and 118a,b will rotate with the antenna rotor. The various segments are joined by means of stationary joints such as 116a,b.

Some of the many advantages and new features of the subject invention should now be apparent in view of the foregoing description. For example, the apparatus described is capable of generating radar return signals from real terrain which simulate aircraft motion but without actually moving the aircraft. The test signal generator is capable of producing test signals having realistic amplitude and doppler histories which are suitable for detailed mode testing in a laboratory environment. Furthermore, the test signal generator according to the present invention is compatible with existing systems for testing coherent air-to-ground radars.

Numerous modifications and variations of the subject invention are possible in light of the above teachings. It is therefore to be understood that within the scope of the appended claims the invention may be practiced otherwise than as specifically described.

What is claimed is:

1. Apparatus for ground testing of air-to-ground microwave doppler radar systems, comprising:

a stationary target;

a stationary radar transmitter remote from said target for propagating microwave signals toward said target;

antenna means remote from said target and said transmitter for receiving the microwave signals reflected from said target, said antenna means including a rotatable vertical shaft, a motor drivingly connected to said shaft for rotation thereof, first and second arms extending in opposite diections from the top of said shaft, a microwave antenna positioned at the free end of said first arm, a counterbalancing weight at the free end of said second arm, waveguide means extending from said antenna through said first arm and said shaft to the base of said shaft;

sensor means operatively connected to said waveguide means at the base of said shaft for providing signals indicative of the angular position of said antenna; and electronic means receiving the microwave signals from said waveguide means and angular position signals from said sensor means, for providing a display signal of the realistic amplitude and doppler history of the target-reflected microwave signals.

2. Apparatus as recited in claim 1 wherein said waveguide means further comprises:

a rotating waveguide section extending from the microwave antenna through the elongated arm and into the vertical shaft.

a stationary waveguide section extending from the vertical shaft to a radar receiver; and rotating connector means for connecting said rotating waveguide section to said stationary waveguide section.

3. Apparatus as recited in claim 2 wherein the rotating connector means comprises a slip ring assembly.

4. Apparatus as recited in claim 3 further comprising a video display system for viewing the display signal.

* * * * *